US008602884B1

(12) United States Patent
Marantelli

(10) Patent No.: US 8,602,884 B1
(45) Date of Patent: Dec. 10, 2013

(54) POOL WAGERING APPARATUS, METHODS AND SYSTEMS

(75) Inventor: Bernard James Marantelli, London (GB)

(73) Assignee: Diogenes Limited (IM)

( * ) Notice: Subject to any disclaimer, the term of this patent is extended or adjusted under 35 U.S.C. 154(b) by 0 days.

(21) Appl. No.: 13/605,813

(22) Filed: Sep. 6, 2012

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC .................. 463/28; 463/20; 463/25; 463/40; 463/42; 273/139; 273/292

(58) Field of Classification Search
USPC ............ 463/20, 25, 28, 40, 42; 273/139, 292
See application file for complete search history.

(56) References Cited

U.S. PATENT DOCUMENTS 7,883,403 B2 2/2011 Low et al.
7,942,735 B2 5/2011 Meyer
8,105,149 B2 1/2012 DeWaal
2005/0116410 A1* 6/2005 Vlazny et al. ................ 273/139
2008/0153579 A1* 6/2008 Brenner et al. ................ 463/25

* cited by examiner

*Primary Examiner* — Omkar Deodhar
*Assistant Examiner* — Adetokunbo O Torimiro
(74) *Attorney, Agent, or Firm* — DLA Piper LLP (US)

(57) ABSTRACT

The present invention is directed to a system, method and apparatus for providing a unique pool betting product where players make selections in a number of different events which occur in sequential legs or time periods. After some and preferably most of the legs have been completed, players who have correct "win" predictions for each of the events or legs that are completed and thus remain in contention for the Jackpot Pool, and potentially those still eligible for consolations prizes, will be offered an opportunity to sell their tickets, in whole or in part, to the game operator or through the game operator.

28 Claims, 5 Drawing Sheets

FIGURE 4

| | 2006-07 | 2007-08 | 2008-09 | 2009-10 | 2010-11 | 2011-12 | | 5 Year Ave |
|---|---|---|---|---|---|---|---|---|
| ENG PREMIER LEAGUE | 2.45 | 2.64 | 2.48 | 2.77 | 2.8 | 2.8 | | 2.66 |
| ESP LA LIGA | 2.48 | 2.69 | 2.9 | 2.71 | 2.74 | 2.77 | | 2.72 |
| ITA SERIE A | 2.55 | 2.55 | 2.6 | 2.61 | 2.51 | 2.56 | | 2.56 |
| GER BUNDESLIGA | 2.74 | 2.81 | 2.92 | 2.83 | 2.92 | 2.87 | | 2.85 |
| FRA LIGUE 1 | 2.25 | 2.28 | 2.26 | 2.41 | 2.34 | 2.47 | | 2.34 |
| EUR CHAMPIONS LEAGUE | 2.49 | 2.64 | 2.63 | 2.54 | 2.84 | 2.77 | | 2.65 |
| WORLD CUP | 2.21 | 2.71 | 2.67 | 2.52 | 2.3 | 2.27 | | 2.45 |

POOL WAGERING APPARATUS, METHODS AND SYSTEMS

BACKGROUND OF THE INVENTION

There are a range of betting and lottery products in the market. For example, there are pure pool betting products, such as the Pick 6 horse racing product in the United States and the Scoop 6 racing product (among others) in the United Kingdom. There are also sports betting products such as football/soccer individual games and/or pool wagering products. Pick 6 and Scoop 6 provides a six leg jackpot type bet that may also include a bonus pool and consolation prizes. The product type is relatively successful and provides players with a chance to win a large sum by betting on six races on a given race day. Similar multiple leg pool wagering is allowed for other types of racing events and multiple sports events.

In the United Kingdom, there also presently exists a free to play game offered by Skybet, the 'Super 6' whereby players are allowed to make just one set of football/soccer correct score selections for a guaranteed payout. The product also has some similarities to the traditional football pools product but is different in that it is not predicting draws and only six selections are necessary. Many countries have similar pool products where betters are asked to select winners in six or seven horse or dog races and can win a share of a large pool. In the United States, numerous states have lotteries where players select for example six numbers and purchase a lottery ticket for a specific drawing. There is also a "Mega Millions" game in which several states participate in a pooled jackpot. The correct selection of all six numbers allows the ticket bearer to claim all or a portion of the pooled jackpot, depending on the number of winning tickets.

In the last few years betting on football/soccer has overtaken betting on races, especially within the UK. The traditional football/soccer pools products in the United Kingdom offer a large payout if the player can select a large number of matches that result in a draw—particularly a score draw. Within football/soccer betting correct score betting is the second most popular market after the central Home/Draw/Away ("H/D/A") markets. A prominent United Kingdom based betting and gaming company recently reported that 84% of its retail football/soccer bets were coupon based accumulators. Almost 90% of those are on four-fold and above. A four-fold is four selections, so 90% of the bets are on four selections and more by comparison for online betting, twice as many bets are singles, and only 55% are four-fold and above. The company went on to report £113 million in football/soccer revenue, the Company is believed to have 12% market share indicating that around £800 million annually is wagered by football/soccer betters, and based on a blended rate of 10% margin, between low margin match odds and higher margin multiple odds, it is estimated that the market is £7 billion for soccer wagering on a yearly basis.

Within this market segment, there is a need for new products to generate and maintain interest. The present invention is directed to a new betting product developed initially to apply to the most globally bet upon sport in the world, football/soccer and specifically United Kingdom premiership football/soccer. The concept, however, has more widespread applications and potential appeal, and thus it may be applied to other types of sporting events as well as being expanded to lotteries, and other multi-leg/multi-events/multi-outcome or divisible games.

SUMMARY OF THE INVENTION

The present invention is directed to a market gap for the creation of a unique pool betting product where players make selections in a number of different events which occur in sequential legs or time periods. Those players who correctly select all of the winners of each leg have an opportunity to share the proceeds of the stakes of all the other players, less a deduction to cover operating costs and operator profit, and have the opportunity to win a Jackpot Pool and potentially a Bonus Pool and Consolation Pool. If no player selects the correct winning combination of results, then the amounts staked available to win may be carried forward in a Jackpot Pool until the next betting cycle, for example the next week, and will be available to win by anyone selecting the correct combination of outcomes. However, to ensure that a significant prize is available in the first cycle or first week or after the Jackpot Pool is claimed, it is contemplated that there may be an operator guaranteed amount in the Jackpot Pool available to win each time the pool games are played, at least until significant reserves have been built up in the Jackpot Pool.

A unique differentiator of the pool product of the present invention is that after some and preferably most of the legs have been completed, players who have correct (win) predictions for each of the events or legs that are completed and thus remain in contention for the Jackpot Pool (and potentially those still eligible for consolations prizes), will be offered an opportunity to sell their tickets (in whole or in part) to the game operator or through the game operator. Thus for example the game operator will offer the player a fractional amount of the potential Jackpot Pool to buy the ticket for the still pending game(s) and thereby provide the player the opportunity to cash in and avoid the risk of being eliminated on a later leg or the final event.

In addition to the Jackpot Pool, there are two other pools that could form part of the pool game. Part of the amount staked could be reserved to provide one or more Consolation Pool(s) which may be won by those who correctly select all except one of the correct outcomes or another consolation scenario. In addition, another part of the amount staked could be reserved to provide a Bonus Pool which will be available to winners of the main pool, if they are able to select an additional outcome after they have successfully won the Jackpot Pool. When either or both of these pools are offered, any purchaser of a ticket such as the operator discussed above would become the owner of the rights in the ticket with respect to the opportunity to win the Consolation Pool(s) or Bonus Pool.

BRIEF DESCRIPTION OF THE DRAWINGS

FIG. 4 is a table depicting goal expectancy for six years across the main soccer leagues and the World Cup.

DETAILED DESCRIPTION OF THE PREFERRED EMBODIMENT

Figure 1:
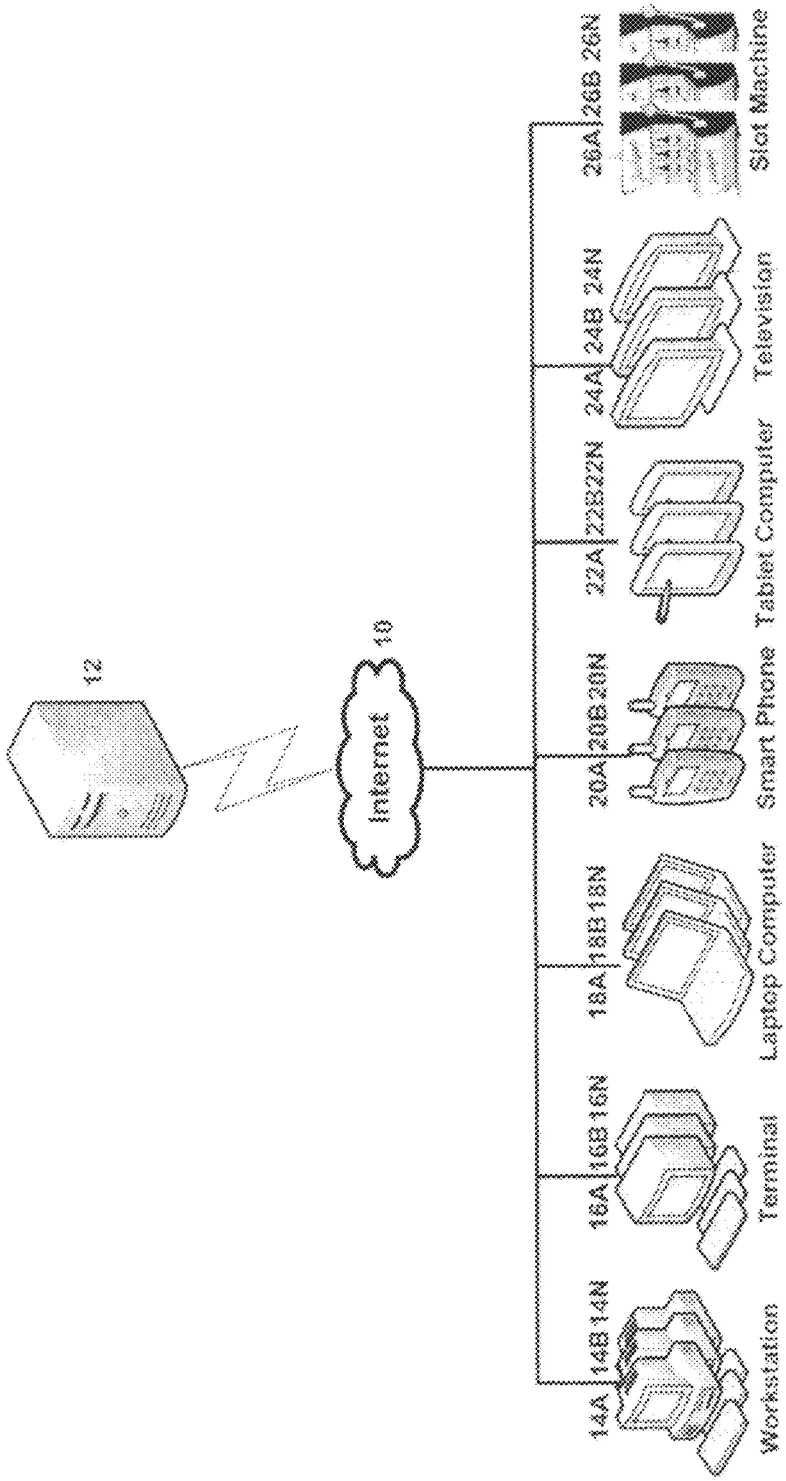
FIG. 1 is a schematic representation of a wagering system hardware and network connected to various wagering stations or wagering terminals and other devices which may be used in accordance with an aspect of the present invention.

FIG. 1 is a schematic of an exemplary wagering system hardware and network that will be used herein to describe and illustrate one implementation of the present invention. The system includes a network, based on a central server system 12 being interconnected through the internet 10 to a plurality of wager input devices such as wagering stations 14, wagering terminals 16, and internet connected computing systems 18, smart phones 20, tablet computers 22 and televisions 24 each of which is representative of a plurality of each type of wager input device (e.g. wagering stations 14A-N). As will also be discussed below, the concepts herein may also be applied to gaming machines, so gaming machine 26 is depicted as an additional input device to the central server system 12 in FIG. 1.

The wager stations 14 and wagering terminals 16 of FIG. 1 are depicted in an exemplary only embodiments, but as known in the art they may include a support structure, housing or cabinet which provides support for a plurality of displays, inputs, controls and other features of a conventional wager terminal. The wagering stations 14 may be configured so that users can be the party placing a wager, while the wagering terminals 16 may be configured for an operator at a commercial location such as a store or betting facility. The wager stations 14 and wagering terminals 16 may be positioned on a base or stand or can be configured as a table-top which a user can operate preferably while sitting. The wagering stations 14 and wagering terminals 16 may further include a device for accepting a monetary value associated with a wager wherein the device may include, for example, a coin collector, a bill collector or a card reader. The wagering stations 14 and wagering terminals 16 may further include a ticket and/or voucher printer to print wager receipts and potentially vouchers representing cash-out values and successful play awards or negotiable instruments such as checks. The wagering stations 14 and wagering terminals 16 may also include a ticket or voucher reader and/or a cash dispenser. Preferably, the bill collector, ticket or voucher reader and cash dispenser would be integrated into a single sub-unit.

The wager stations 14 and wagering terminals 16 preferably include at least one processor, such as a microprocessor, a microcontroller-based platform, a suitable integrated circuit or one or more application-specific integrated circuits (ASIC's). The processor is in communication with or operable to access or to exchange signals with at least one data storage or memory device. The processor and the memory device reside within the cabinet. The memory device stores program code and instructions, executable by the processor, to control the wager stations 14 and wagering terminals 16 and communicate with the central server system 12. The memory device also stores other data such as image data, event data, user input data, ticket tracking assignment generators, pay-table data or information and applicable rules that relate to the operation of the wager stations 14 and wagering terminals 16 and the particular type of buy-out method and process described herein.

It is also contemplated that an operator or a player can use a computing system 18, such as a desktop computer, a laptop personal computer, a personal digital assistant (PDA) or smartphone 20, portable tablet computing device 22, or other computerized platform or interactive web-enabled television 24 to access the central server system 12 via a network, internet or intranet, so as to initiate a wager and access the collective wagering pool. In this implementation, it is contemplated the users' devices would also receive messages and the buy-out offers discussed below from the pool operator via the central server system 12, so that the individual user could participate in the pool wagering system and buy-back option via the user's connected device.

It is contemplated that the wager stations 14, wager terminals 16 and/or personal computing systems 18, as well as the smart phones 20, tablet computers 22 and televisions 24 disclosed herein may be operable over a wired or wireless network, such as part of a wired or wireless wagering system. In this embodiment, the computing systems 18 may be a hand held device, a mobile device or any other suitable wireless device that enables a user to participate in the pooled wagering system at any suitable location. It is contemplated that the computing systems 18 or at least the server system as disclosed herein may be a device that has obtained approval from a regulatory agency or commission or a device that has not obtained or require approval from a regulatory agency or commission.

Figure 2:
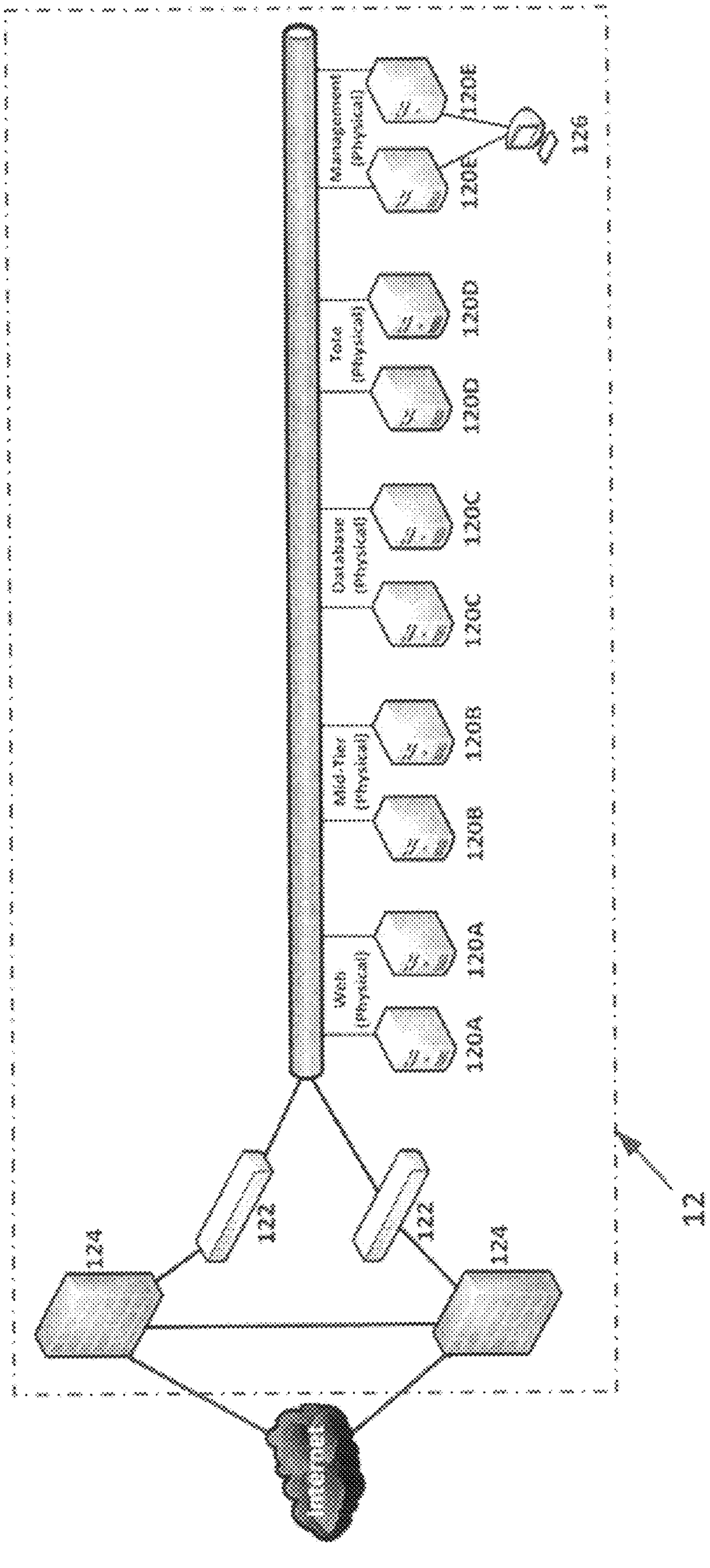
FIG. 2 is a more detailed schematic representation of the wagering system hardware and network that controls the operation of the system of FIG. 1.

FIG. 2 is a more detailed schematic representation of the wagering system hardware of the central server system 12 that controls the operation of the system of FIG. 1. The central server system 12 may include one or more rack mounted server computers 120 each with at least one central processing unit (CPU) or other processing device and associated memory. As an example only, the rack mounted server computers 120 of FIG. 2 may be PowerEdge R420 Rack Chassis devices having a 300 GB hard drive, one or two Intel Xeon E5-2450 processors, 24 GB memories with RAID connectivity using a RAID controller card. One or more of the computers 120 may also include an input device, an output device and a driver for a display device. The computers 120 within the central server system 12 are shown as being hardwired to each other and to the internet, but the respective computers or portions of the network may include either wired or wireless connectivity to the internet, to an intranet or an alternative networked communication system.

In addition to the respective computers 120, the central server system as depicted in FIG. 2 includes two network switches 122 and two firewall devices 124. The network switches 122 may for example be Hewlett Packard model 2510-48G Switches and the firewall devices 124 may be Cisco Model ASA 5520 firewalls and associated software. As illustrated, the firewall devices 124 are interconnected to each other and to the internet, and each firewall device 124 is also connected to one of the network switches 122.

Figure 3:
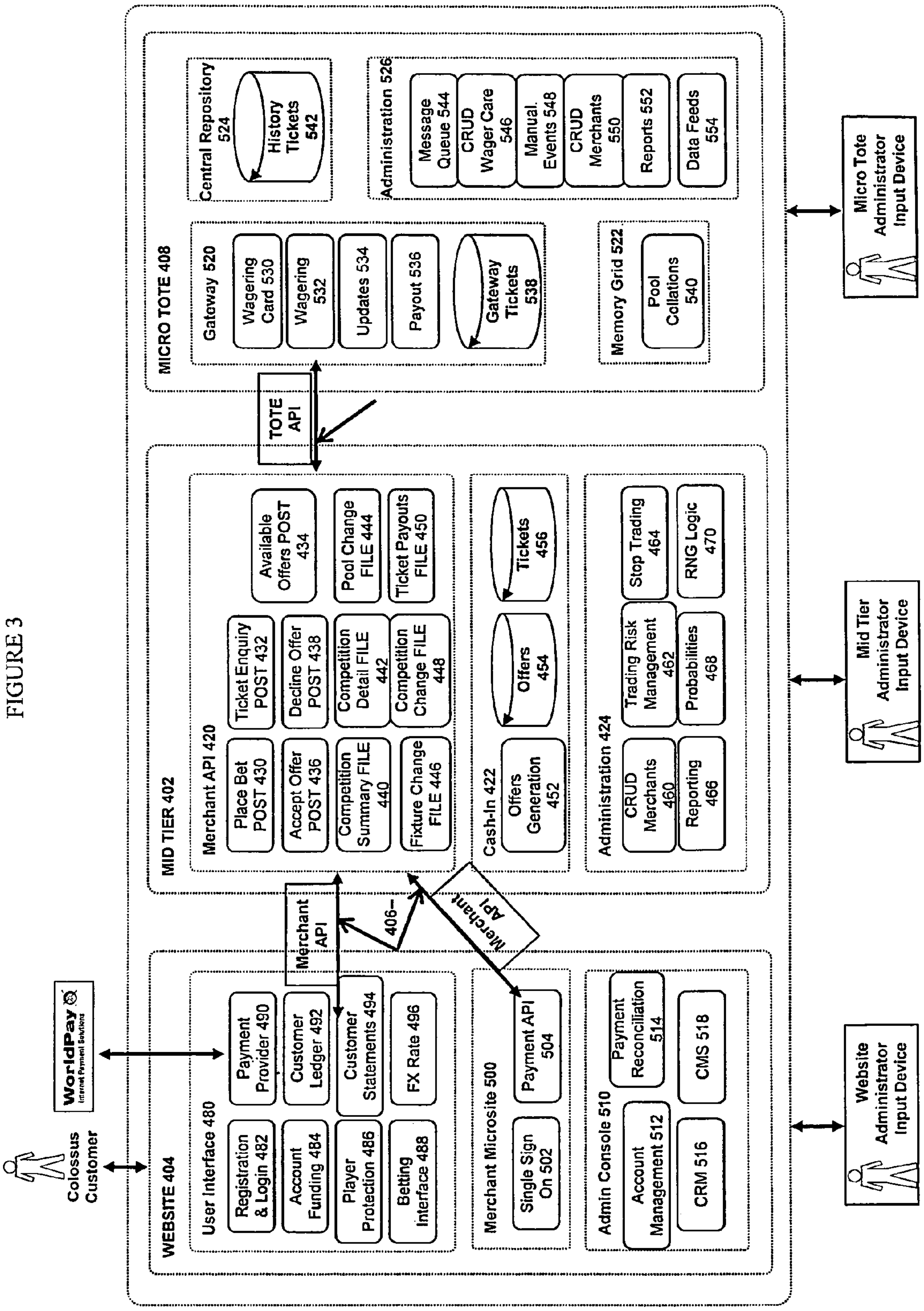
FIG. 3 is a block diagram of the functional architecture of a program for the wagering system hardware of FIG. 2.

The network switches 122 are connected to the respective computers 120, which as shown are divided into logical functions to control certain aspects of the operation of the wagering system which may be best understood in connection with the block diagram of the functional architecture of the program for the wagering system illustrated in FIG. 3. In FIG. 2, there is a redundancy for the respective computers 120 such that as shown there are two computers 120 for each of the tasks, and the redundant computers 120 are interconnected.

As illustrated in FIG. 2, the five pairs of computers are depicted interconnected through a bus, and through the bus to switches 122. The five pairs include computers 120A, associated with the web interface and connectivity, computers 120B associated with the Mid-Tier program, computers 120C for a database, computers 120C for a Tote program and computers 120E providing the management interface for the central server system, all as described in more detail below in connection with FIG. 3. The computers 120E are shown including a workstation 126 including an input device such as a keyboard and an output or display device such as a monitor. Also, the respective computers need not be located in the same facility, thus for example the computers 120D providing the Tote functionality may be remote from the computers 120B providing the Mid-Tier functionality.

The central server system 12 of FIGS. 1 and 2 will preferably include software programs for wagering software functionality such as registration, deposit taking, withdrawals, account sections that may include current and previous bet histories, fixtures, results, historical data, rules and regulations. These types of software programs having these functionalities are in place in various totalizer facilities and are thus known in the art. However, FIG. 3 is provided to further illustrate the process steps of the program and operation of the central server system 12 associated with the pool wagering system contemplated by the present invention. The program for the known functionality of a totalizer facility noted above would be incorporated in the Micro Tote 408 program, as discussed further below.

FIG. 3 represents the functional architecture of the program hosted or supported by the central server system 12. The core program is represented by the center block identified as the "Mid Tier" program 402. The Mid Tier program 402 interacts with the respective customer and website administrator input programs in the left side block identified as the Website program 404, as well as the accounting programs in the right side block identified as the Micro Tote program 408. The Mid Tier program 402 communicates using an "Application Program Interface" hereinafter "API," allowing bi-directional communication to, and through, the Mid Tier program 402, as represented by the Merchant API 406 as between the Website program 404 and the Mid Tier program 402, and the Tote API 410 as between the Micro Tote program 408 and the Mid Tier program 402, reference lines.

The Mid Tier program 402, as shown in FIG. 3, may include a Merchant API 420 program, a Cash-in 422 program and an Administration 424 program. It is contemplated that the Mid Tier program 402 may be itself a dedicated stand-alone server system and program for hosting the pool based wagering system of the present invention, or the subroutines unique to the pool based wagering system of the present invention may be added to a server system and program that also hosts other types of wagering pools.

As depicted in the Merchant API 420 program box, there may be several HTTP POST request sub-routines including a Place Bet POST 430, Ticket Enquiry POST 432, Available offers POST 434, Accept Offer POST 436, Decline Offer POST 438. The Place Bet POST 430 routine is used to place a bet on the Operator system. The Ticket Enquiry POST 432 routine is used to confirm that a ticket has been sold on the Operator system. The Available offers POST 434 routine is used to determine what bet trading offers are currently available to the customer. The Accept Offer POST 436 routine is used to accept an offer. The Decline Offer POST 438 routine is used to decline an offer.

As depicted in the Merchant API 420 program box, there may be several files sub-routines including a Competition Summary FILE 440, a Competition Detail FILE 442, a Pool Change FILE 444, a Fixture Change FILE 446, a Competition Change FILE 448 and a Ticket Payouts FILE 450. The Competition Summary FILE 440 routine holds a summary list of the available competitions It is updated when new competitions are added, old ones are deleted, or when the status or current fixture changes. The Competition Detail FILE 442 routine holds details about the competition. The Pool Change FILE 444 routine holds details on pool-level information changes on a competition. The Fixture Change FILE 446 routine holds details when fixture-level changes on a competition. The Competition Change FILE 448 routine holds details when competition-level information changes. The Ticket Payouts FILE 450 routine holds details for each pool as its status becomes official.

The Mid Tier program 402, as shown in FIG. 3, includes most critically the Cash-In 422 program, which itself may include the Offers Generation 452 routine, the Offers 454 routine and the Tickets 456 routine. The Cash-In 422 program is responsible for determining when an offer to buy-out a ticket holder will be made, and the price that will be offered. Within the Cash-In 422 program, the Offers Generation 452 routine is the trading engine that, when triggered, will generate a set of offers over all of the tickets that are still potential winners and then publish the offers and receive/process the acceptance of these offers via the Merchant API 420. The Offers 454 routine stores all the offer made, accepted and declined. The Tickets 456 routine stores all the tickets for a pool and who the rightful owner is.

Further, the Mid Tier program 402, as also shown in FIG. 3, may include the Administration 424 program, which itself may include a Create Read Update Delete (CRUD) Merchants 460 routine, Trading Risk Management 462 routine, Stop Trading 464 routine, Reporting 466 routine, Probabilities 468 routine and Random Number Generator (RNG) Logic 470 routine. The Merchants 460 routine is to create, read, update and delete third party Merchant details within the Mid Tier. The Trading Risk Management 462 routine is to allow the control and monitoring of cash-in trading. The Stop Trading 464 routine is to allow cash-in trading to be stopped if required. The Reporting 466 routine is for calculating and reporting on settlement with Merchant systems. The Probabilities 468 routine is for the uploading of probabilities used in the trading calculations. The RNG Logic 470 routine is use for QuickPick bets.

Traditional quick picks generally allocate selections to people either randomly as prevalent in lotteries (where each number has equal probability of being drawn), or in-line with some estimated probabilities such as horse racing (or other event where outcomes do not have equal probability or prospects). it is intended that quick picks in the initial iterations of these games may or may not be in fact SMART PICKS, in that a quick pick will only be allocated to the client if it has a relatively realistic chance of providing the winning outcome and in a relative sense to the size of the pool or guarantee. For examples in the seven leg correct score game, some outcomes are less than 1 million to one where other outcomes are greater than 1 trillion to one. The smart pick will not allocate a quick pick ticket to a client unless it is within a certain multiple of the pool size, say five times. A such when the pool is £5 million, all quick picks (smart picks) will only be allocated to clients wanting a quickpick (smart pick), if they are less than 25 million to one. The reason for this smart pick adjustment is to ensure that smart pick players are not grossly disadvantaged by being allocated a ticket with very minimal probability of success, especially in reactions to the pool size.

Now referring to the left side block of FIG. 3, the Website program 404 may be represented as including subprograms for a user interface 480 representing a dedicated website on which wagers may be entered for example by a customer using a personal computer or alternatively a wagering terminal as discussed above. Once logged into the website, the user interface 480 provides a registration and login routine 482, an account funding routine 484, a player protection routine 486 and a betting interface routine 488. The user interface 480 also provides a routine to allow interconnection with a payment provider 490, for example WORLDPAY®, providing a secure method by which payments for wagers may be submitted. The user interface 480 may also provide routines to provide a customer ledger 492, customer statements 494 and currency exchange rate calculator 496.

As an alternative to the customer using a dedicated website, it is contemplated that the users could interact with a Merchant Microsite 500, representing for example an established betting house or parlor having its own customer base and methods of collecting wagers and paying disbursements from and to players. These types of Merchant Microsites 500 would be provided with their own Merchant API 406 for communicating with the server hosting the Mid Tier 402 program. The Merchant Microsites 500 include routines for single sign on 502 to the wagering pool and a payment API 504 to assist in the respective accounting functions as between the operator of the Merchant Microsite 500 and the host of the pool wagering system hosted on the central server system 12.

As also reflected in the Website program 404, the Administrative (Admin) Console 510 routine is provided to manage the User Interface 480. The Admin Console 510 routine, operated by the website administrator, may include an Account Management 512 routine for managing customer account details, a Payment Reconciliation 514 routine for administration of customer deposits and withdrawals with a payment provider like WORLDPAY®, a Customer Relationship Management (CRM) 516 routine for managing sales, marketing and customer service interactions with customers and a Content Management System (CMS) 518 routine for the creation, editing and publishing on content on the Website 404.

Now referring to the right side block of FIG. 3, the Micro Tote 408 routine is the program equivalent to a "Totalisator" which receives, calculates and provides a display output for all bets made in a given progressive pool bet system. The Micro Tote 408 routine may thus include a Gateway 520 program, a Memory Grid 522 program, a Central Repository 524 program and an Administration 526 program. The Gateway 520 program includes a routine posting the wagering card 530, summing all of the wagering 532, providing updates 534, and calculating each potential payout 536. The Gateway 520 program also includes a routine for pooling and accumulating all of the Gateway Tickets 538, which is the master routine for each bet that has been placed and accepted in the pool.

Also within the Micro Tote 408 is a Memory Grid 522 program that includes a Pool Collations 540 routine. The Pool Collations 540 routine calculates and continuously recalculates the odds as each bet is placed and accepted, and as each event result occurs within the pool, so as to determine the odds with respect to each remaining active ticket within the pool bet. The odds and all information calculated by the Pool Collations 540 routine is routed through the Tote API 410 to the Mid-Tier 402, and specifically to the Merchant API 420, Cash-in 422 and Administration 424 routines.

Also within the Micro Tote 408 is a Central Repository 524 program that includes a Ticket History 542 routine. The Ticket History 542 routine retains a complete record of each bet placed, each respective ticket, all payouts, and all unpaid credits for all of the respective pools. The information within the Ticket History 542 routine may be maintained primarily for the benefit of regulators and/or oversight organizations and taxing agencies.

Finally, the Micro Tote 408 may also include an Administration 526 program that includes routines for Message Queue 544 which is for inter-process communications within the Micro Tote, Create Read Update Delete (CRUD) Wager Card 546 is for setting up the event information that will be wagered on, Manual Events 548 is for manually managing updates to events, CRUD Merchants 550 is for create, read, update and delete third party Merchant information on the Micro Tote, reports 552 is for settlement reports for the Micro Tote and Data Feeds 554 is for third party event feeds.

With respect to the software programs of FIG. 3, and with respect to the respective computers of FIG. 2, computers 120A drive the consumer websites 480, merchant microsites 500 and the website administration console 510, computers 120B host the main Mid-Tier program for driving the merchant API 420, cash-in 422 and mid-tier administration console 424, computers 120C host the program for physically maintaining the Customer Ledger database 492, computers 120D host the program for physically maintaining the Tote 408 that consists of Gateway 520, Memory Grid 522, Central Repository 524 and Tote administration console 526, and computers 120E host the program providing the physical management interface for the entire interrelated system software.

For the pool wagering and option buy-out system of the present invention, the central server system 12 is programmed to provide to the wager stations 14, wager terminals 16 or personal devices 18, 20, 22 or 24 various options for placing wagers on a sequence of sporting events spread over an appropriate interval. The wager stations 14, wager terminals 16 or personal computing systems 18 would allow a better to place a wager on a series of sporting events, for example three to eight football/soccer matches scheduled to occur over a three day period. The better would select the winners, or in some embodiments the particular scores of the matches, for each particular sporting event within a defined cumulated pool. The better would receive either a printed ticket or an electronic ticket representing the selections and the amount of the bet. The controller or server system 12 would maintain the pool, assign tracking identifiers to each wager and ticket placed into the pool, and determine any payout requirements from the pooled wagers in the event of a successful selection of all of the events.

The wager stations 14 and wager terminals 16 preferably include one or more display devices controlled by the processor. The display devices are preferably connected to or mounted to the cabinet of the wager terminal. The embodiments as generally illustrated in FIG. 1 may include, as known in the art, a display device which displays the betting options. This display device may also display any suitable secondary information associated with the pool wagering system. The wager stations 14 and wager terminals 16 may include a credit display which displays a player's current number of credits, cash, account balance or the equivalent. In one embodiment, wager terminal includes a bet display which displays a player's amount wagered.

The wager stations 14 and wager terminals 16 may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The wager stations 14 and wager terminals 16 also preferably include at least one payment acceptor in communication with the processor. The payment acceptor may include a coin slot and a payment, note or bill acceptor, where the player inserts money, coins or tokens. The player can place coins in the coin slot or paper money, a ticket or voucher into the payment, note or bill acceptor. In other alternatives, devices such as readers or validators for credit cards, debit cards or credit slips may accept payment. A player may insert an identification card into a card reader of the wager stations 14 and wager terminals 16. The identification card may be a smart card having a programmed microchip or a magnetic strip coded with a player's identification, credit totals (or related data) and other relevant information. A player may carry a portable device, such as a cell phone, a radio frequency identification tag or any other suitable wireless device, which communicates a player's identification, credit totals (or related data) and other relevant information to the wager stations 14 and wager terminals 16. Money may be transferred to a wager station 14 or wager terminal 16 through electronic funds transfer. When a player funds the wager station 14 or wager terminal 16, the processor determines the amount of funds entered and displays the corresponding amount on the credit display or other suitable display.

The wager stations 14 and wager terminals 16 include at least one and preferably a plurality of input devices in communication with the processor. The input devices can include any suitable device which enables the player to produce an input signal which is received by the processor. After appropriate funding of the wager station 14 or wager terminal 16 the input device is a game selection device or a game play button which is used by the player to identify the selected outcome of each of the games/matches/legs of the pool wager on the wager station 14 or wager terminal 16.

As this first embodiment of the pool bet system is premised on betting of sporting events, the server has an input device 26 allowing an operator to enter the results of the sporting events, the winners of the matches or games, the final scores and/or other parameters such as the total score of the game or the point differential. It is contemplated that this information will be entered reasonably promptly following the completion, and if required certification, of the sporting event. With the results of the sporting events for a first sequence of events, the system will make a determination as to whether any individual wagers recorded in the system have correctly selected the winners (or point spread etc.) of the sporting events.

After some percentage, usually a majority, of the sporting events have occurred, the server system 12 will be configured to identify the remaining potential winning ticket or tickets for the Jackpot Pool, i.e. those tickets that have correctly selected each of the results of the events of the completed legs. Upon determining the number of remaining potential winners of the Jackpot Pool, the system will determine the likelihood of each ticket winning the Jackpot Pool, and on that basis make a determination as to the attributed value of the ticket based on its respective probability of winning the Jackpot Pool. The server system 12 then makes the determination of what the appropriate amount would be for an offer to buy-out all, or potentially a portion of, each or all of the remaining potentially winning tickets.

By way of example, upon presentation of the ticket to one of the wager stations 14 or wager terminals 16, the ticket will be verified and the system will present the offer to purchase the whole ticket will be displayed on the display devices, and the player will have the option to accept or reject the offer via an input to the wager station 14 or wager terminal 16. The player can also be presented with the option to sell any fraction of a ticket he/she wishes to sell through the wager station 14 or wager terminal 16. The player may be offered the option of selling different fractions of the ticket at different stages or after respective legs of the pool event. For example the player may sell 10% after fourth leg, another 20% after the fifth leg and 30% after the sixth leg, thereby still retaining 40% of the original ticket to the conclusion of the game after the seventh leg.

As another example, if after 5 matches (or legs) of a 6 match pool there are 3 remaining tickets that have correctly identified the outcomes of the first five matches (or legs), and all having an equal chance of winning the $1 million Jackpot Pool, then the server system 12 may calculate that each ticket has a potential value of $100,000. This would be the case if each person held an outcome in isolation of the other two tickets, and then the probability of each of the three owned outcomes was 10% or a price of 10.0 in decimal terms. Upon application of a risk factor and/or margin discount, the server system 12 would establish an attributed value and then communicate an offer to purchase the respective tickets to each of the ticket holders, at a price of for example $80,000 for each ticket, representing a 20% margin for the purchaser. The offered amount would represent a substantial return on a $2 ticket, and removing significant volatility for the player, that was one step from winning $1,000,000 but also one step from winning nothing. The offer could be for a partial portion of the ticket, for example an equal fifty percent share, at $40,000. In this option, it is contemplated that various percentage offers could be made, for example any 10% interval from 10% to 90%, at an appropriate monetary amount. Thus, the player in the above example could sell 10% of the ticket for $8,000 and retain the potential of receiving 90% of the $1,000,000 Jackpot Pool.

It is also contemplated that the server system 12 will have the ability to receive additional data via the input device 26, for example various odds on respective wagers concerning the sporting match or event, that may impact the attributed value calculated for any given ticket. That additional information could be used to calculate to a greater precision the potential odds, and attributed value, of the remaining tickets after each round or leg of the pool. Thus, in the example above, if one of the remaining 3 potentially winning tickets has predicted the final score of the final soccer match as 2-1, while another has selected the final score as being 1-10, then the more likely score of 2-1 will have a higher attributed value than the ticket having selected 1-10. In that event, the ticket holder of the 2-1 score match may be offered more, as that ticket's attributed value (or expected value in mathematical probability terms) will be higher.

To further explain the example, the outcome probability factor (OPF) and the Expected Value (EV) of two respective tickets with the following score predictions may be set as:

2-1 price (OPF?)=10.0

1-10 price (OPF?)=1000 (as it is an unrealistic score but useful for this example)

EV=1,000,000 (POOL)/Price of outcome/number of tickets holding that outcome

Therefore, the ticket with the score of the final leg being 2-1 will have an estimated value in a $1,000,000 pool calculated as 1000000/10/1=$100,000 while the ticket with the score of the final leg being 1-10 1 will have an estimated value in a $1,000,000 pool calculated as 1000000/1000/1=$1000. Therefore the person having the ticket predicting the 2-1 outcome will be offered in the region of 100 times more for his ticket as he is 100 times more likely correct and thereby has a chance to win the $1,000,000 jackpot.

This mathematical calculation of EV of fair value can be extended to the entire range of tickets that exist—and extended backwards to the tickets remaining after the very first leg if appropriate. The ticket holders could be offered "cash in" values from as soon as is acceptable and viable, but it is envisaged that most cash in circumstances will occur later in the game when the potential values begin to rise significantly. It is also contemplated that in games where there is a Consolation Pool or a Bonus Pool in addition to the jackpot, the ticket cash-in or buy back will include the purchase of the rights to the other pools, and the price offered will include the EV/FV/theoretical value of the bonus ticket given the live tickets remaining.

As another option in the system, the buy-back or cash-in offer may be staged or an iterative bidding process. Thus, even after a first offer is made and rejected, the operator may elect to make another higher offer upon a subsequent presentation of a ticket. However, the holder of the ticket will not necessarily be given a second offer once the first offer is rejected so that the ticket holder will be unaware of whether a greater offer will follow or if they will be locked into the "hold" position until the conclusion of the next match or leg of the game.

An output device such as televisions 24 may also be coupled with the central server system 12 computers 120 and configured, for example, to display the pool of betting combinations and a representation of the tickets or wagers that are active in the system resulting from the bettor-selected game predictions and the results of the respective games or events that have been completed which form part or all of the pool events. Such an output device 24 may also include, for example, a visual display and/or a printing device. Additionally, such an output device 24 may be configured to display the results of an event taking place at a remote venue, such as the event forming the next leg of the pool. Thus, a betting parlor may have a series of televisions and monitors broadcasting the event (soccer match), while also displaying streaming data concerning for example the number of tickets that remain in the pool, alerts when a goal is scored that eliminates tickets from the pool, and potentially the offers to buy outstanding tickets.

The wagering stations 14A and wager terminals 16A may be located at a first venue, while other wagering stations 14B-14N and wager terminals 16B-16N may be located at other remotely located venues. Thus, the network formed of the plurality of wagering stations 14A-14N and wager terminals 16A-16N may enable wagering on, and monitoring of, events at multiple venues substantially simultaneously if so desired. Accordingly, it is contemplated that the operator could have wagering stations 14A-14N and/or wager terminals 16A-16N in multiple locations within a city, or multiple locations within a state, country or region, so as to allow pooling of bets in the game across a significant population to drive the amounts of the Jackpot Pool to substantial values for each individual game, series of events/matches.

In another embodiment, the wagering stations 14A-14N may be located in a single venue such as a race track where, for example, a first wagering station 14A acts as a server for all of the other wagering stations 14B-14N networked to it for conducting the pool wagering activity, with wagering stations 14B-14N acting as terminals coupled with the server of first wagering station 14A.

It may be appreciated that the pool wagering activity and buy-out option according to the present invention may be effected in a specific environment at a specific location on a stand-alone (or closed) system or may be electronically linked to include play in a plurality of environments or at a plurality of locations. For example, the wagering stations 14A-14N and wager terminals 16A-16N may be distributed throughout a variety of wagering venues including race tracks, off-track betting facilities, retail establishments (where legal), casinos, lotteries, and on the Internet. Further, such wagering activity and evaluation thereof may provide automatic and immediate performance feedback (individual and team performance, leader boards or other indicia of participant standings, contest time remaining, account balances, etc.) to participants via text messaging, cellular telephones, PDAs, interactive television, email, Internet browsers or other applications. Here again, the wide distribution of available outlets and devices for entering into the game is intended to allow pooling of bets in the game across a significant population to drive the amounts of the Jackpot Pool to substantial values for each individual game, series of events/matches.

In a sports or event based wagering environment, the product concept can be applied to a number of different sports and markets. For convenience, the first implementation of the product will be described with respect to a series of football/soccer correct score and "Home/Draw/Away ("H/D/A") markets pooled and bet on a weekly basis. The system operator will select multiple game (three, four, five, six or seven games) that will occur over the following days or a weekend. For example, the system operator may select three games on a Saturday, two games on a Sunday and the final one or two games on a Monday. Players will be challenged to select the correct score for each of the games. To win the Jackpot Pool, the player must select the correct score of each of the six or seven games. The cash in function described herein may be applied even on low leg games such as a pick 3, but it is envisaged that the public will not cash in generally on such short term low payout events.

Accordingly, the system operator may offer several different multi-leg outcomes. For an exemplary description, a version of the pool wagering system will be described using a six leg correct score game run over six soccer matches. However, it should be readily apparent that the pool wagering system may be adapted to a PICK-n correct score model. In a league where the most likely results in any soccer match will have a high score of three for either team as shown in FIG. 4 reflecting the total goal expectancy over six years for six premier leagues and the world cup. In the six leg pool wagering system, each leg will consist of seventeen outcomes, these being 1-0, 2-0, 2-1, 3-0, 3-2, 3-2 and "AO HW" (any other home win) then 0-0, 1-1, and "AO D" (any other draw) and the reciprocal away results, to allow each leg to consist of 17 outcomes.

It should be understood that the foregoing is exemplary and the potential outcomes can be varied and may not be consistent over various leagues where the number of goals scored may be higher on average. The alternative anticipated scores for such a league may only influence the distribution, but not the applicability of the game, which will have a set of probabilities for each respective outcome that may be league dependent.

It is contemplated that the operator may provide that the minimum amount of the "Jackpot Pool" is guaranteed at a set level, and most of the other bets offered could be guaranteed to insure first day retail popularity. Those players who correctly select scores and winners of each leg will share the maximum of the guarantee or the stakes of all the others (or the guarantee) and also gain entry into a bonus pool. The Bonus Pool may be won or shared by any individuals that successfully choose one correct score the following week.

A Consolation Pool may be shared by those who select all the correct outcomes (H/D/A) or another subset of the correct score game, or on other variations based on, for example, any five of six or six of seven. The player in this example will not need to nominate H/D/A but his correct score prediction 'Home 2-0' will naturally be allocated to a "Home" outcome in the H/D/A determination of the Consolation Pool. As such on correct score pick 7-7 correct H/D/A results in-line with the players CS will mean they "win" the consolation prize.

As each match is played—and each goal is scored—player bets represented by their respective tickets will gradually be eliminated from the remaining tickets that can still win the Jackpot Pool. Those that remain will be able to anticipate that the value of their tickets increases as they see the results of each game. The central server system 12 may be configured to allow the display of the tickets that remain active for the Jackpot Pool on each of the wagering terminals or alternatively a display board at distributed wagering locations as commonly provided in present establishments for example to display football/soccer matches, racing events and available wagering events and odds. While the flagship of the pool play will be the Jackpot Pool for correctly selecting the six or seven correct scores, other games such a pick three could also be offered to be completed within a single day or short time period.

Between legs, and preferably after several of the games or matches have been completed, but potentially also during the course of an event for example at the half-time of a match or event, players with "live" tickets will be offered the option of selling all or a portion of their tickets back to the system operator or hang on to their tickets and see whether their correct score predictions will unfold for the remaining games. The buy-out option will preferably be communicated through the wagering station 14, wagering terminal 16, or internet connected computing devices 18-24 from which the respective wager was placed and ticket purchased. However, as the wagering stations 14 wagering terminals 16 may not be accessible to the player, it is further contemplated that at the point in time that the player places a wager in the pool play of the present invention they will provide contact information to allow communication with their computing system 18 that is linked on the central server system 12 to the particular ticket. Thus, the central server system 12 will be able to send a message to the ticket holder's computing system 18, smart phone 20, or tablet computer 22, providing details of the buy-out offer. If the ticket holder decides to cash in the ticket in response to the offer, the ticket holder may communicate the acceptance via the computing system 18, smart phone 20, or tablet computer 22, to the central server system 12. Alternatively, the ticket holder would present the ticket to one of the wagering stations 14 or wagering terminals 16 which in turn communicate the acceptance to the central server system 12, and upon verification, provide the ticket bearer with a payout in the form of cash, a voucher or check. If necessary or appropriate in the respective jurisdiction, the amount of the payout may be reduced in an amount required to be withheld for tax purposes.

It is anticipated that for the pool wagering system with the buy-back option of the present invention that there will be an initial guarantee by the operator of the Jackpot Pool in an amount sufficient to create initial interest, for example $1 million. Thereby, Jackpot Pool winners will always be guaranteed to win all or a share of a Jackpot Pool equal or in excess of $1 million. In a first embodiment of the system and product, with respect to each ticket purchased the split following the takeout (currently set at 25%) may be as follows: 75% to fund the Jackpot Pool, 15% to fund the Bonus Pool, and 10% to fund the Consolation Pool(s). Other splits may be desirable and are expressly contemplated. Therefore if $250,000 (i.e. 125,000×$2 per ticket) was bet into the pool in the first week, the Jackpot Pool would stand at $140,625 (i.e. $250,000×0.75×0.75=$140,625), but any winners would share in the $1 million guaranteed Jackpot Pool. Any winners of the Consolation Pool (i.e. those selecting five out of six of the correct scores accurately) will split a share of $25,000 between them less deductions (i.e. $25,000×0.75). The following week, winners would get the opportunity to select a correct score (for each successful ticket) from a featured match to be in with a chance of winning the Bonus Pool. Anyone who correctly predicts that correct score would therefore net a share of the Bonus Pool.

Should the Jackpot Pool and Bonus Pool not be won for a few weeks, then those pools may build up to very significant amounts. For example, if players bet a total of $3,000,000 into the Jackpot Pool (over a period) but fail to win the main Jackpot Pool prize, then a total win/jackpot payout of $2,250,000 will have built up and any winners the following week will get a share of that amount plus a share of the amounts staked in that week. Therefore, if another $3,000,000 is bet into the Jackpot Pool then the potential winnings will stand at $4,500,000. Should three people win the game, then they will split $4,500,000, giving them $1,500,000 winnings each (less their price of purchase). The Consolation Pool will have been won previously—in all likelihood—and will for example stand at about $300,000 from the current week's stakes. If 30 players select five out of six correct scores that week, then they will win $7,500 each. The Bonus Pool will not have been won (yet) and will stand at $450,000 but will pay the maximum possible of the Bonus Pool. The three winners will have the chance to win the Bonus Pool in the next week, each getting one selection.

As the matches or games for each of the respective tickets are preferably staggered over 2, 3 or even 4 days (typically 3 days Saturday to Monday), the system operator will have the ability to communicate to the respective wagering outlets or through an online interface to offer players the ability to sell back any tickets which are still 'live' after at least one but preferably several of the matches as discussed above. For example, if a player has a ticket where the first three matches on a Saturday were predicted correctly, he/she will have the facility to sell back to the system operator the same ticket and close out their position before Sunday's matches. The buy-back value will be calculated by the server, potentially under the control of the system operator or the business partner, based on the number of match legs the ticket has already correctly predicted plus the remaining predictions for the subsequent games. When a ticket is cashed in (i.e. bought back by the system operator), the ticket and all the rights of the ticket will vest in the system operator. In addition, this buy-out facility will include a margin for the system operator, anticipated to be around 15%.

For example, if, going into the Monday night games, a player has two tickets which are still in play, and their predictions for the final two matches are 2-3 and 1-0 on one ticket and 2-2 and 1-0 on the other ticket, they will have the option to cash in either or both of their tickets. The server system under the direction and control of the system operator will calculate the estimated odds of winning the pool (and payout) with either ticket and will offer a buyback value to the player. The mechanism will be clearly explained to players who can opt to either exercise the opportunity to sell back their position or stay in the game until the end. While as noted above the central server system 12 may have the ability to provide information on the number of tickets that are still in play after each leg or match in the pool, it is also contemplated that the information would not be communicated to the respective ticket holders who receive the buy-out offer. Thus, the ticket holder may not be aware that there are only a few as opposed to dozens of still viable tickets in a given pool when the buy-out offer is communicated. It may however be beneficial to communicate with the holders of every remaining live ticket the exact number of outstanding live tickets. The only time the disclosures may not be communicated will be during concurrent games and when live ticket cashing in becomes available.

It is also envisioned that cash-in buy back may also operate during live play and offer continuous cash-in ability as soon as it is technically possible, for example at the half-time of a match or during the running of a match when possible. It is also contemplated that a ticket could be purchased with two or more potential outcomes selected for the final legs or events, for example by paying twice as much the player could have five legs predicted and then have two different outcomes for the sixth leg. In such an event, the system may offer to buy both outcomes, or each outcome and thereby divide the ticket as between the original player and the system operator. This type of fragmentation of the tickets could be extended to any leg of the event.

The ticket buy back process may include an interactive process that bids the ticket holder in a sequence of events for the ticket. For example, the system operator might originally offer the client $100,000 for a ticket that has 5 correct scores, if the client declines to sell the ticket, the system operator might revert to offer $105,000. At each step the ticket holder will not be aware if that is the final buy-out offer or a better buy-out offer will occur. The ticket holder may have the period between the offer and the start of the next leg of the bet in which to make up their minds. Once the next leg has started buy-out offers will be automatically withdrawn. It is further contemplated that the ability to trade or sell your tickets back to the system operator will be continuous and in these circumstances, the bid will be extremely time sensitive. Additionally, as discussed above the player or ticket holder will have the option to sell a fraction of his ticket to the system operator. In the first instance this facility will probably be limited to 10% fractions. A player that sells a portion of his ticket back to the system operator will then only get paid in respect of the remaining fraction of the bet should the ticket be successful. The system operator will pay the other portion to itself (or the ticket purchaser) if that ticket was successful.

If a player retains a portion of a ticket that is successful and thus entitles him to play the bonus game, the player will be allowed one selection, but will only win the fraction of the Bonus Pool that he holds in the winning ticket. As mentioned above, when a ticket is cashed in (i.e. bought back by the system operator), the ticket and all the rights of the ticket will vest in the system operator. As such, the system operator would hold the other portion of the ticket and be entitled to select an outcome in the bonus leg and win the portion (or whole) bonus. It is contemplated that where the system operator holds a whole or part of a bonus ticket, they will need to nominate their selection earlier than the remaining players, for example the system operator must nominate their selection 2 hours prior the start of the bonus game, and members of the public will only need to offer their selection 1 hour before. This rule would help ensure that the system operator selection cannot be made with the prior knowledge of the public selection. As a default, any player having a valid qualifying ticket that does not make a selection in the Bonus Pool for their bonus ticket will be allocated a selection having a high probability, for example a 1-1 draw.

In a first implementation it is anticipated that only the system operator will be able to offer the buy-out option to the active tickets holders using the central server system 12 to communicate the offers. However, it is also contemplated that the system operator may use the central server system 12 to solicit offers from third parties that would be communicated to the active ticket holder. In this embodiment, the central server system 12 could communicate the details of the outstanding active tickets through all or a select number of wagering terminals 16 and allow bids for the outstanding active tickets to be submitted via the wagering terminals 16.

As another alternative embodiment, it is contemplated that the system operator could facilitate the ability of members of the public to buy and sell active tickets in a Betfair type exchange. Thus, it is also contemplated that the central server system 12 could allow the posting of available buy back options so that the public could place buy-back offers for example though the wagering terminals 14 and the ticket holder could select the buy-back bid of his or her choosing.

Figure 5:
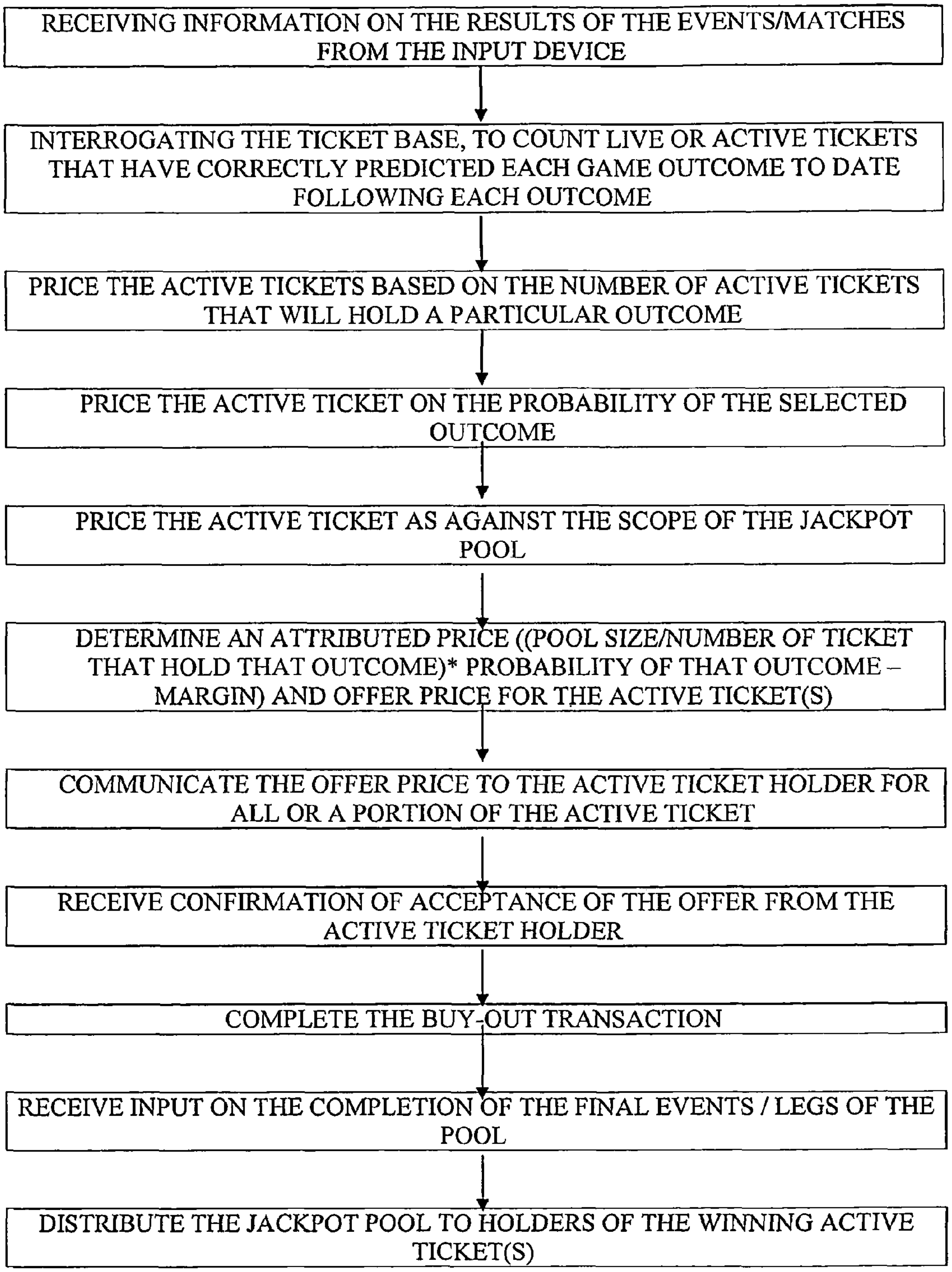
FIG. 5 is an exemplary flow chart of the logic of the software subroutine program of the central server system.

With the foregoing description of the implementation, it may be appreciated that during the course of the pool wagering event, the central server system 12 will go through the process steps, as shown in FIG. 5, of:

a) receiving information on the results of the events/matches from the input device;

b) interrogating the ticket base, to count live or active tickets that have correctly predicted each game outcome to date following each outcome;

c) price the active tickets based on the number of active tickets that will hold a particular outcome;

d) price the active ticket on the probability of the selected outcome;

e) price the active ticket as against the scope of the Jackpot Pool;

f) determine an attributed price ((pool size/number of ticket that hold that outcome)*probability of that outcome−margin) and offer price for the active ticket(s);

g) communicate the offer price to the active ticket holder for all or a portion of the active ticket;

h) receive confirmation of acceptance of the offer from the active ticket holder;

i) complete the buy-out transaction;

j) receive input on the completion of the final events/legs of the pool;

k) distribute the Jackpot Pool to holders of the winning active ticket(s).

Further, the concept and system disclosed herein can be adapted for other multi-outcome wagering scenarios including as a first example slot machines. In this first alternative, the system could be incorporated into a progressive jackpot played for example on a slot machine 26 as depicted in FIG. 1. Currently, slot machine based games have an outcome which is determined almost immediately even though the machine may take a few seconds to display the results. Even in the present systems, the game is complete before a person has the chance to realize that they are getting closer and closer to the premier prize. In most examples the reels stop one by one, but only 1 second or so between each reel. However, the display of each reel stopping is primarily for effect as the outcome of the game is determined by the random number generator in the game controller shortly after the play is initiated.

The present disclosure may be implemented in various configurations for gaming machines or wager terminals known in the art, including but not limited to a dedicated gaming machine or wager terminal, wherein the computerized instructions for controlling any games (which are provided by the gaming machine or wager terminal) are provided with the gaming machine or wager terminal prior to delivery to a gaming establishment, and a changeable gaming machine or wager terminal, where the computerized instructions for controlling any games (which are provided by the gaming machine or wager terminal) are downloadable to the gaming machine or wager terminal through a data network when the gaming machine or wager terminal is in a gaming establishment. These types of gaming machines and their respective operation in both stand alone and pool or progressive games are disclosed in detail in U.S. Pat. No. 8,105,149, incorporated herein by reference.

By incorporating the concept of the present invention, the slot machine could be programmed such that once a first level of jackpot indicators appear in a winning sequence according to a first random number generation, the selection and display of the remaining indicator is paused and an offer to buy-out the player is presented. For example, a person with four "$" on the first four reels and the last real spinning is one step from a jackpot, (e.g. $2,000,000) and if the machine has a 20/1 odds to get the last real on a "$" then the operator would offer to buy-the spin for $100,000, or any fraction of it for the proportionate amount. If the player accepted the buyout, the machine would print a cash-out ticket for the buyout amount. The player either accepts the offer, or the fractional offer, or rejects the offer whereupon the random number for the remaining wheel is generated and the spin is completed. If the buyout was accepted and the final indicator selection results in a win, then the operator banks the amount of the jackpot. If the player sells only a fraction of the potential jackpot, then the player receives credits, either on the machine or in a ticket print, of the fractional remainder and the operator banks the balance.

It is anticipated that the concept will provide great drama and a limited period for it to be resolved, over a minute or more, and allow players to play trade and control their fate. From an operator standpoint, there may be a limit on the duration of the buyout offer, for example thirty seconds or one minute, that may be counted down for the player on the display, so that the player is forced to make a decision or simply allow the time to expire and the last indicator to be selected. While in theory the system could be used as soon as a single indicator is selected, it is believed that the system is more practically implemented when there are several indicators that must align before extending the final spin to provide the buyout or trade-in option. Thus, it is contemplated that the option would not be provided until the bet/selection has been 70-90% resolved or else the value of the buyout option is not sufficient to entice the player to cash-out and the progress and rate of play may be unacceptably slowed down.

The slot machine based system provides additional benefits to the house or casino in which the machine is located. First, for an in-house only progressive or pool game system, the buy-back option allows the house to bid on and potentially receive (if the bid is accepted) the accumulated jackpot pool. In addition, in the event that the jackpot pool is a progressive or pool game distributed over a number of properties, so that the jackpot pool will grow faster or in the event that a gaming machine manufacturer licenses the use of the machines across various properties, the casino hosting the game (or the gaming machine OEM) may offer the buy-out of the jackpot pool option at the termination of the first spin and, again if the bid is accepted, the casino making the offer would receive the jackpot pool as if it were the player who had won. In this situation, the host casino would generate revenues from the game play contributed to the jackpot pool that occurred in other casinos.

In accordance with the buy-out pool option of the present invention, the cash out button of the gaming machine 26 may be illuminated when the first sequence of the display for example the first three of four reels align such that the player may be on track to win the Jackpot Pool. In that event, the central server system 12 or the wager terminal itself causes the display to present a buy-out offer to the player for a fraction of the Jackpot Pool. If the player elects to cash-out, the player may push the cash out button and cash out to receive a cash payment or other suitable form of payment corresponding to the offer presented on the display, whereupon the remaining random selection is made to determine if the Jackpot Pool is won.

In one embodiment, the player may be offered the option of cashing out a percentage of the potential Jackpot Pool, for example by depressing the cash out button the players sells 10% or 25% of the potential Jackpot Pool for the amount offered on the display. If the player for example sells 50% of the Jackpot Pool opportunity for $50,000, the player will be issued a credit for the $50,000 and then the remaining wheel spin or leg is completed. If the result is a win of the Jackpot Pool, then the player will receive credits for 50% of the Jackpot Pool, while the operator or house retains the remainder.

When the player decides to end the game play, he can select the cash out button at which time the player may receive cash or other payout mechanisms such as tickets or credit slips redeemable by a cashier (or other suitable redemption system) or funding to the player's electronically recordable identification card or the players online account.

It is further contemplated that the jackpot buyout option and the concept and system disclosed herein can be adapted for a variety of other 'multi leg,' multi-outcome wagering scenarios, keno, poker, racing and state or national lottery systems. For example in a lottery system, after the periodic ticket purchase interval, the lottery operator would draw the first 5 balls on weekend and then determine the number of tickets having the correct numbers. For the remaining tickets, the lottery would offer to have the ticket holders attend the draw of the remaining numbers in a live event (perhaps the following week). Before the remaining number(s) are selected, the lottery operator would provide the remaining ticket holders with a buyout option, available to a limited number of players or all of them on occasion, but a bidding process would add drama to the conclusion of the game. The buyout bid could potentially be provided to all the people at the same amount for their ticket and let them rush to accept, closing the bidding process once a certain percentage have sold their ticket, then draw the last ball.

It should be understood that various changes and modifications to the presently preferred embodiments described herein will be apparent to those skilled in the art. For example, the gaming system disclosed herein may provide the awards to winning players in any suitable manner, such as through a suitable bonus or secondary game or event determined by the implementer or operator of the gaming system, and may include:

1) Dividing any multi (betting/dealing/trading) outcome into its sub components.
2) Allow change of ticket ownership after each stage of the game being resolved.
3) Calculate the odds specifically or just allow market forces to determine a sale price or a mixture of both.
4) Transact, with or without a bidding process or joint bidding process, the ticket exchange.

The implementer or operator of the gaming system disclosed herein may also designate the number of awards, the time at which those awards are provided to each winning player, the number of rounds in the bonus event, the number of designated outcomes in each round and/or the number of available outcomes in each round to suitable values. Such changes and modifications can be made without departing from the spirit and scope of the present invention and without diminishing its intended advantages. It is therefore intended that such changes and modifications be covered by the appended claims.

What is claimed is:

1. A wagering system including at least one wagering device for allowing the placement of a wager on a multi-leg event pool, the wagering system comprising:

a server system controller configured to communicate with the at least one wagering device, said server system controller programmed to:

initiate a multi-leg event pool by the generation of a game having a series of events, the correct selection of the results of the series of the events resulting in the award of at least a portion of a jackpot, and accepting wagers on the multi-leg event from players;

recognize when, after a set number of the events, there remain wagers having the potential of winning the jackpot;

cause the display of a representation of a portion of the game results in a manner that indicates that a jackpot can result based on the outcome of the game;

generate and cause the display of a full or partial buyout proposal; and issue at least one of a payment and a credit to the player if the proposal is accepted.

2. The wagering system of claim 1, wherein the server system controller is further programmed to award the jackpot, or any fractional portion thereof to which a player remains entitled, based on the number of legs won upon completion of the multi-leg event pool.

3. The wagering system of claim 1, wherein the wagering devices further comprise at least one of a wagering terminal, a wagering workstation, a personal computer, a smart phone, and a tablet computing device.

4. The wagering system of claim 3, wherein the wagering devices further comprise:

at least one input device, at least one display device, at least one processor, and at least one memory device which stores a plurality of instructions which when executed by the at least one processor, cause the at least one processor to operate with the at least one display device to display the multi-leg event pool game options for the placement of a wager.

5. The wagering system of claim 1, wherein the wagering devices comprise a gaming machine capable of displaying multi-leg event results.

6. The wagering system of claim 1, wherein the multi-leg event comprises at least two sporting events or portions of a single sporting event.

7. The wagering system of claim 6, wherein the at least two sporting events or portions of a single sporting event comprise betting options comprising one or more selected from the group consisting of 1-0, 2-0, 2-1, 3-0, 3-2, 3-2 and “AOH” (any other home win) then 0-0, 1-1, and “AOD” (any other draw) and the reciprocal away results.

8. The wagering system of claim 1, wherein the transfer of ownership from the player to a third party can occur on an unresolved leg or wager and at a price comprising at cost or an agreed upon price, and wherein the buyout proposal is initiated on behalf of a third party and capable of being made at any time, including between or during any leg of the multi-leg event and when a buyout proposal is accepted by a player, the third party obtains ownership of the player’s position at the time of acceptance.

9. The wagering system of claim 8, wherein after the buyout proposal is made, the buyout proposal is terminated or changed upon the occurrence of predefined events.

10. The wagering system of claim 9, wherein the occurrence of predefined events comprises at least one of: before the next event in the multi-leg event starts and on probability impacting events selected from the group comprising score and time remaining in a game.

11. The wagering system of claim 8, wherein after the buyout proposal is made, the buyout proposal is terminated and a second buyout proposal is made.

12. The wagering system of claim 1, wherein the buyout proposal is based on one or more of an attributed value, winner count, pool count, an outcome probability factor and an expected value of each wager during or after each event in the multi-leg event pool is completed.

13. The wagering system of claim 1, wherein the player may sell a portion of the wager after respective legs of the pool event have been completed.

14. The wagering system of claim 1, wherein the buyout proposal is provided by a third party.

15. The wagering system of claim 1, wherein the wager comprises a quickpick.

16. The wagering system of claim 1, wherein the wager comprises at least one of a single wager and a plurality of wagers corresponding to the multi-leg event.

17. The wagering system of claim 1, wherein the buyout proposal corresponds to live tickets during the occurrence of any leg of a multi-leg event.

18. The wagering system of claim 1, wherein a wager may comprise a plurality of separate divisions, and with each division corresponding to one or more separate legs of the multi-leg event, and with ownership of each division of the wager capable of being exchanged from a player to another party at any desired time.

19. The wagering system of claim 1, wherein the server system controller is further programmed to award a consolation jackpot, or any fractional portion thereof, to a player winning a consolation scenario.

20. The wagering system of claim 19, wherein the consolation scenario comprising at least one of winning a predetermined subset of the legs defining the multi-leg event and selecting a predetermined number of non-winning legs that each finishes within a predetermined position of a corresponding winning leg.

21. The wagering system of claim 1, wherein the multi-leg event pool is at least one of fixed, variable and guaranteed.

22. The wagering system of claim 1, wherein the server system controller is further programmed to roll at least a portion of the jackpot into another multi-leg event pool.

23. The wagering system of claim 1, wherein the server system controller is further programmed to award at least a portion of the jackpot to an operator of the multi-leg event pool.

24. A method of conducting a multi-event pooled wager wherein a player having correctly selected the outcome of a number of the events is presented with a buy-out offer, the method comprising the steps of:

providing a server system controller configured to communicate with wagering devices on which a player may make selections for each event of a multi-event pool, wherein said server system controller:

initiates a multi-leg event pool by the generation of a game having a series of events, the correct selection of the results of at least a portion of the series of the events resulting in the award of at least a portion of the pooled wagers as a jackpot and accepting wagers on the multi-leg event from players;

recognizes when, after a set number of the events, there remain wagers having the potential of winning the pooled wagers jackpot;

causes the display of a representation of any portion of the game results in a manner that indicates that a jackpot can result based on the outcome of the game;

generates and causes the display of a full or partial buyout proposal; and issue at least one of a payment and a credit to the player if the proposal is accepted.

25. The wagering method of claim 24, wherein said server system controller awards the jackpot, or any fractional portion thereof to which a player remains entitled, based on the number of legs won upon completion of the multi-leg event pool.

26. The wagering method of claim 24, wherein the multi-leg event pool is at least one of fixed, variable and guaranteed.

27. The wagering method of claim 24, wherein the server system controller rolls at least a portion of the jackpot into another multi-leg event pool.

28. The wagering method of claim 24, wherein the server system controller awards at least a portion of the jackpot to an operator of the multi-leg event pool.

* * * * *